(12) United States Patent
Gong

(10) Patent No.: US 11,164,191 B2
(45) Date of Patent: Nov. 2, 2021

(54) SYSTEM AND METHOD FOR SUPPLYING AGRICULTURAL PRODUCTS, AND TRANSACTION PROCESSING METHOD FOR AGRICULTURAL PRODUCTS

(71) Applicant: GUANGZHOU XAIRCRAFT TECHNOLOGY CO., LTD., Guangdong (CN)

(72) Inventor: Jiaqin Gong, Guangzhou (CN)

(73) Assignee: GUANGZHOU XAIRCRAFT TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 16/766,271

(22) PCT Filed: Oct. 30, 2019

(86) PCT No.: PCT/CN2019/114414
§ 371 (c)(1),
(2) Date: May 21, 2020

(87) PCT Pub. No.: WO2020/119309
PCT Pub. Date: Jun. 18, 2020

(65) Prior Publication Data
US 2020/0380532 A1 Dec. 3, 2020

(30) Foreign Application Priority Data
Dec. 14, 2018 (CN) .......................... 201811534476.8

(51) Int. Cl.
*G06Q 30/00* (2012.01)
*G06K 7/14* (2006.01)
(Continued)

(52) U.S. Cl.
CPC .......... *G06Q 30/0185* (2013.01); *B60Q 9/00* (2013.01); *E05F 15/70* (2015.01); *G06K 7/1413* (2013.01);
(Continued)

(58) Field of Classification Search
None
See application file for complete search history.

(56) References Cited

U.S. PATENT DOCUMENTS

2019/0220815 A1* 7/2019 Nelson ............... G06Q 10/0836

FOREIGN PATENT DOCUMENTS

| CN | 101587569 A | 11/2009 |
|---|---|---|
| CN | 105608585 A | 5/2016 |

* cited by examiner

*Primary Examiner* — Kristy A Haupt
(74) *Attorney, Agent, or Firm* — Maschoff Brennan

(57) ABSTRACT

A system and method for supplying agricultural products, and a transaction processing method for agricultural products are provided. The system includes: a server, a monitoring device, and a transit device, wherein the server is configured to receive a selection instruction from a consumer terminal, determine a transit device in accordance with the selection instruction, and assign a verification code corresponding to the transit device to the consumer terminal; the monitoring device has a correspondence relation with a place of origin of a target agricultural product, and is configured to acquire an identity verification result of the transit device and generate a control instruction for opening a loading port of the transit device when the identity verification result indicates that the verification is passed; the transit device is configured to accommodate the target agricultural product.

19 Claims, 4 Drawing Sheets

(51) Int. Cl.
*G06K 19/06* (2006.01)
*G06Q 20/32* (2012.01)
*G06Q 30/06* (2012.01)
*E05F 15/70* (2015.01)
*B60Q 9/00* (2006.01)
*G06Q 50/02* (2012.01)
*G06Q 50/28* (2012.01)
*G07C 9/00* (2020.01)
*H04N 5/76* (2006.01)

(52) U.S. Cl.
CPC ..... *G06K 7/1417* (2013.01); *G06K 19/06028* (2013.01); *G06K 19/06037* (2013.01); *G06Q 20/3276* (2013.01); *G06Q 30/0633* (2013.01); *G06Q 50/02* (2013.01); *G06Q 50/28* (2013.01); *G07C 9/00182* (2013.01); *H04N 5/76* (2013.01); *E05Y 2400/45* (2013.01); *E05Y 2400/85* (2013.01); *E05Y 2900/516* (2013.01); *E05Y 2900/602* (2013.01)

SYSTEM AND METHOD FOR SUPPLYING AGRICULTURAL PRODUCTS, AND TRANSACTION PROCESSING METHOD FOR AGRICULTURAL PRODUCTS

CROSS-REFERENCE TO RELATED APPLICATIONS

The present disclosure claims priority of Chinese Patent Application No. 201811534476.8, filed with the Chinese Patent Office on Dec. 14, 2018, entitled "System and Method for Supplying Agricultural Products, and Transaction Processing Method for Agricultural Products", which is incorporated herein by reference in its entirety.

TECHNICAL FIELD

The present disclosure relates to the field of agricultural product supply, and in particular to a system and method for supplying agricultural products, and a transaction processing method for agricultural products.

BACKGROUND ART

At the current stage of the agricultural product transaction process, in general, farmers sell the picked agricultural products to middlemen, and then consumers conduct transactions with the middlemen for purchase of the agricultural products. This transaction model has a long history and is currently a relatively mature transaction model, which provides convenience in the daily lives of a mass number of consumers.

However, the above transaction model has the problem that consumers are unable to determine the authentic origins of the purchased agricultural products due to lack of direct contact between the consumers and farmers.

SUMMARY

Embodiments of the present disclosure provide a system and method for supplying agricultural products, and a transaction processing method for agricultural products, so as to solve at least the technical problem that farmers acquire low profits and the price paid by consumers often does not equal the value of the purchased agricultural products due to absence of direct contact between the consumers and the farmers in the prior agricultural product transaction model.

According to an embodiment of the present disclosure, a system for supplying agricultural products is provided, including: a server, a monitoring device, and a transit device, wherein the server is configured to receive a selection instruction from a consumer terminal, determine a transit device in accordance with the selection instruction, and assign a verification code corresponding to the transit device to the consumer terminal, wherein the verification code is used for providing a verification basis for a consumer to open a pickup port of the transit device, and the selection instruction is at least used for selecting a place of origin of a target agricultural product; the monitoring device has a correspondence relation with the place of origin of the target agricultural product, and is configured to acquire an identity verification result of the transit device and generate a control instruction for opening a loading port of the transit device when the identity verification result indicates that the verification is passed; and the transit device is configured to accommodate the target agricultural product.

Optionally, the monitoring device is configured to scan the transit device to obtain first identity information about the transit device; and to determine the identity verification result based on the first identity information.

Optionally, the monitoring device is further configured to match the first identity information with second identity information acquired in advance; and to determine that the transit device passes the verification when the matching result indicates that the first identity information is consistent with the second identity information.

Optionally, the monitoring device is further configured to acquire the second identity information by: receiving from the server the second identity information determined in accordance with the selection instruction.

Optionally, the server is further configured to send, according to the selection instruction sent from the consumer terminal, the second identity information to a monitoring device corresponding to the place of origin of the target agricultural product.

Optionally, the monitoring device is further configured to send the first identity information to the server; the server is further configured to compare the first identity information with the second identity information determined in accordance with the selection instruction, determine the identity verification result in accordance with the comparison result, and send the identity verification result to the monitoring device, wherein the identity verification result is determined as passing the verification when the comparison result indicates that the first identity information is consistent with the second identity information.

Optionally, the server is configured to acquire the location of the monitoring device that sends the first identity information, and compare and verify the location of the monitoring device with the place of origin of the target agricultural product obtained from the selection instruction, and compare, after the verification is passed, the first identity information with the second identity information determined in accordance with the selection instruction and determine the identity verification result in accordance with the comparison result.

Optionally, the monitoring device is further configured to capture and record multimedia information about a picking process in which the agricultural products are at the place of origin, and send the multimedia information to the consumer terminal or the server.

Optionally, the system further includes the consumer terminal, wherein the consumer terminal is further configured to scan a graphical identifier displayed on a target object and display the multimedia information in an interface determined based on the scan result, wherein the target object includes: the transit device or the target agricultural product; or the multimedia information is displayed in an order interface of the consumer terminal, wherein the order interface is configured to display an order request of the target agricultural product.

Optionally, the selection instruction further includes: farmer information corresponding to the target agricultural product.

Optionally, the server is further configured to determine a terminal identifier corresponding to the farmer information based on the farmer information; and send a notification message to a mobile terminal corresponding to the terminal identifier, wherein the notification message is used for notifying the farmer to collect the target agricultural product.

Optionally, the server is further configured to receive location information sent from the mobile terminal; match the location information with the place of origin; and send a command of acquiring the identity verification result to the monitoring device when the location information and the place of origin are determined to be consistent through matching.

Optionally, the monitoring device is further configured to:

issue a warning prompt in a case where it is detected that the loading port of the transit device is in an opened state and the transit device is moved outside a monitoring range of the monitoring device; or control the transit device to close the loading port when it is detected that the transit device is moved outside the monitoring range of the monitoring device from the monitoring range of the monitoring device, and to acquire an identity verification result of the transit device again to verify the transit device when it is detected that the transit device is moved into the monitoring range again.

According to an embodiment of the present disclosure, another system for supplying agricultural products is provided, including: a monitoring device and a transit device configured to accommodate a target agricultural product, wherein the monitoring device has a correspondence relation with a place of origin of the target agricultural product, and is configured to acquire an identity verification result of the transit device, and generate a control instruction for opening a loading port of the transit device when the identity verification result indicates that the verification is passed.

Optionally, the monitoring device is further configured to issue a warning prompt in a case where it is detected that the loading port of the transit device is in an opened state and the transit device is moved outside a monitoring range of the monitoring device; or to control the transit device to close the loading port when it is detected that the transit device is moved outside the monitoring range of the monitoring device from the monitoring range of the monitoring device, and to acquire an identity verification result of the transit device again to verify the transit device when it is detected that the transit device is moved into the monitoring range again.

According to an embodiment of the present disclosure, another system for supplying agricultural products is provided, including: a server, a farmer terminal, and a transit device, wherein the server is configured to receive a selection instruction from a consumer terminal; determine a transit device in accordance with the selection instruction; and assign a first verification code corresponding to the transit device to the consumer terminal, wherein the first verification code is used for providing a verification basis for a consumer to open a pickup port of the transit device, and the selection instruction is at least used for selecting a place of origin of a target agricultural product; the farmer terminal is configured to send location information to the server; and receive a second verification code sent from the server, and control the transit device to open the loading port in accordance with the second verification code; the server is further configured to match the location information with the place of origin and send the second verification code to the farmer terminal when the location information and the place of origin are determined to be consistent through matching; the transit device is configured to accommodate the target agricultural product.

According to an embodiment of the present disclosure, another system for supplying agricultural products is provided, including: a server and a transit device configured to accommodate a target agricultural product, wherein the server is configured to receive a selection instruction from a consumer terminal; determine the transit device in accordance with the selection instruction; and assign a first verification code corresponding to the transit device to the consumer terminal, wherein the first verification code is used for providing a verification basis for a consumer to open a pickup port of the transit device, and the selection instruction is used at least for selecting a place of origin of a target agricultural product; the transit device is configured to send location information of the transit device to the server; receive a second verification code sent from the server, and control a loading port of the transit device to be opened in accordance with the second verification code; the server is further configured to match the location information with the place of origin and send the second verification code to the transit device when the location information and the place of origin are determined to be consistent through matching.

According to an embodiment of the present disclosure, a method for supplying agricultural products is provided, including: receiving a selection instruction from a consumer terminal, wherein the selection instruction is at least used for selecting a place of origin of a target agricultural product; determining, in accordance with the selection instruction, a transit device configured to accommodate the target agricultural product; and sending a verification code corresponding to the transit device to a consumer terminal, wherein the verification code is used for providing a verification basis for a consumer to open a pickup port of the transit device.

Optionally, the above method further includes: receiving first identity information sent from a monitoring device having a correspondence relation with the place of origin of the target agricultural product, wherein the first identity information is acquired by the monitoring device by scanning the transit device; comparing the first identity information with second identity information determined in accordance with the selection instruction; determining an identity verification result of the transit device in accordance with the comparison result; and sending the identity verification result to the monitoring device, wherein the identity verification result is used for generating a control instruction for opening a loading port of the transit device.

According to an embodiment of the present disclosure, another method for supplying agricultural products is provided, including: a monitoring device scanning a transit device to acquire first identity information about the transit device, wherein the first identity information has a correspondence relation with a place or origin of a target agricultural product; the monitoring device acquiring a verification result of the first identity information, and generating a control instruction as to whether to open a loading port of the transit device in accordance with the verification result; and the monitoring device sending the control instruction to the transit device.

Optionally, the monitoring device acquiring a result of verification of the first identity information includes one of the following:

the monitoring device comparing the first identity information with second identity information acquired in advance, and determining the verification result in accordance with the comparison result; and the monitoring device sending the identity information to the server, and the monitoring device receiving, the verification result of the first identity information from the server.

Optionally, the monitoring device acquiring a result of verification of the first identity information includes: the monitoring device acquiring location information of the monitoring device and sending the location information to the server; the server matching the location information with the place of origin, and verifying the first identity information and sending the verification result to the monitoring device when the location information and the place of origin are determined to be consistent through matching.

According to an embodiment of the present disclosure, a transaction processing method for agricultural products is provided, including: receiving a selection instruction from a consumer, wherein the selection instruction is at least used for selecting a place of origin of a target agricultural product; receiving a verification code determined by a server in accordance with the place of origin, wherein the verification code provides a verification basis for opening of a pickup port of the transit device, wherein the transit device is configured to accommodate the target agricultural product; generating a control instruction in accordance with the verification code, and sending the control instruction to the transit device, wherein the control instruction is for opening an unloading port of the transit device.

Optionally, the above method further includes: receiving multimedia information generated at the place of origin of the target agricultural product, wherein the multimedia information is used for reflecting a process of operation on the target agricultural product at the place of origin of the target agricultural product; and displaying the multimedia information.

Optionally, the receiving the multimedia information generated at the place of origin of the target agricultural product includes: scanning a graphical identifier displayed on a target object and displaying the multimedia information in an interface determined based on the scan result, wherein the target object includes: the transit device or the target agricultural product; or displaying the multimedia information in an order interface of the consumer terminal, wherein the order interface is configured to display an order request of the target agricultural product.

Optionally, the selection instruction further includes: farmer information corresponding to the target agricultural product.

According to an embodiment of the present disclosure, a transit device configured to accommodate a target agricultural product is provided, including: an accommodating cavity configured to accommodate a target agricultural product, wherein the accommodating cavity is provided with a pickup port and a loading port; a transceiver circuit configured to receive a first unlocking instruction from a consumer terminal and a second unlocking instruction from a monitoring device, wherein the monitoring device has a correspondence relation with a place of origin of the target agricultural product; and a switch device configured to open the pickup port in accordance with the first unlocking instruction and open the loading port in accordance with the second unlocking instruction.

In the embodiment of the present disclosure, a system for supplying agricultural products is provided, including: a server, a monitoring device, and a transit device, wherein the server is configured to receive a selection instruction from a consumer terminal, determine a transit device in accordance with the selection instruction, and assign a verification code corresponding to the transit device to the consumer terminal, wherein the verification code is used for providing a verification basis for a consumer to open a pickup port of the transit device, and the selection instruction is at least used for selecting a place of origin of a target agricultural product; the monitoring device has a correspondence relation with the place of origin of the target agricultural product, and is configured to acquire an identity verification result of the transit device and generate a control instruction for opening a loading port of the transit device when the identity verification result indicates that the verification is passed; and the transit device is configured to accommodate the target agricultural product. The interaction and cooperation between a server, monitoring devices, and transit devices enable consumers to know that agricultural products purchased by them come from places of origin selected by them, so that direct contact between consumers and farmers is established, whereby the following technical effects are achieved during the agricultural product transaction: the trust between consumers and farmers can be enhanced, the farmer end can benefit more from the value chain, and some profits can be surrendered to the consumers to indirectly improve the quality of life of the consumers, thereby solving the technical problem that farmers acquire low profits and the price paid by consumers often does not equal the value of the purchased agricultural products due to absence of direct contact between the consumers and the farmers in the prior agricultural product transaction model.

BRIEF DESCRIPTION OF DRAWINGS

The drawings described herein are intended to provide a further understanding of the present disclosure and constitute a part of the present disclosure. The schematic embodiments of the present disclosure and the description thereof are intended to explain the present disclosure and do not improperly limit the present disclosure. In the drawings.

DETAILED DESCRIPTION OF EMBODIMENTS

In order to enable those skilled in the art to better understand the solutions of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. All the other embodiments obtained by those of ordinary skill in the art in light of the embodiments of the present disclosure without inventive efforts will fall within the scope of the present disclosure as claimed.

It should be noted that the terms such as "first" and "second" in the specification, the claims, and the above accompanying drawings of the present disclosure are intended to distinguish between similar objects but do not necessarily indicate a specific order or precedence. It should be understood that data used in this way are interchangeable in a proper circumstance, so that the embodiments of the present disclosure described herein can be implemented in orders other than those illustrated or described herein. Moreover, the terms "including", "comprising", and any other variants are intended to cover non-exclusive inclusions, and for example, a process, method, system, product, or device that includes a list of steps or units is not necessarily limited to those steps or units expressly listed, but may include other steps or units not expressly listed or inherent to such a process, method, product, or device.

According to an embodiment of the present disclosure, a system for supplying agricultural products is provided. It should be noted that steps shown in flowcharts of the accompanying drawings may be executed in a computer system containing, such as, a set of computer-executable instructions, and although a logical sequence is shown in each flowchart, the illustrated or described steps may be executed in a sequence different from that described here in some cases.

Figure 1:
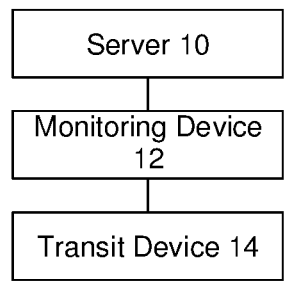
FIG. 1 is a structural diagram of a system for supplying agricultural products according to an embodiment of the present disclosure.

FIG. 1 is a structural diagram of a system for supplying agricultural products according to this embodiment. As shown in FIG. 1, the system includes: a server 10, a monitoring device 12, and a transit device 14, wherein the server 10 is configured to receive a selection instruction from a consumer terminal, determine a transit device 14 in accordance with the selection instruction, and assign a verification code corresponding to the transit device 14 to the consumer terminal, wherein the verification code is used for providing a verification basis for a consumer to open a pickup port of the transit device 14, and the selection instruction is at least used for selecting a place of origin of a target agricultural product.

According to an optional example of this embodiment, in the process of an agricultural product transaction, a goods box may be used as the transit device when a consumer purchases agricultural products such as vegetables/fruit from a certain farmer or a certain land (which may be selected from an area such as a country, a province, an urban area, or the like, to an individual farmland). The consumer places an order via software or an official account of social software (e.g. Wechat) on a mobile terminal after selecting an agricultural product(s) to be purchased. After the consumer places the order, the server 10 automatically assigns a goods box to the order. Here, the goods box is provided thereon with a two-dimensional code (QR code) or barcode, and the two-dimensional code or barcode has a unique correspondence relation with the order. It should be noted that the correspondence relation between the order and the two-dimensional code or barcode is time-effective. For example, if the consumer fails to make a payment within two hours after the order is placed, the above-mentioned correspondence relation becomes invalid. In other words, if the consumer fails to make a payment within a certain preset time after the order is placed, the server 10 may assign the goods box to a new order.

After the consumer successfully makes the payment, the server 10 sends a verification code to the consumer. The verification code has a correspondence relation with the goods box. After the consumer receives the goods box, the goods box can be opened only in accordance with the verification code. For example, after the consumer receives the goods box, the goods box can be opened only when the consumer scans a two-dimensional code or barcode on the goods box and then enters the verification code. The pickup port (or pickup opening) on the goods box may also serve as a loading port (or loading opening). This function can prevent the goods from being swapped (stealthily substituted) or artificially damaged during transportation.

The monitoring device 12 has a correspondence relation with the place of origin of the target agricultural product, and is configured to acquire an identity verification (or authentication) result of the transit device 14 and generate a control instruction for opening the loading port of the transit device 14 when the identity verification result indicates that the verification is passed.

In some optional examples of this embodiment, the monitoring device 12 may be disposed in a farmland or near the farmland, and may be powered by a solar panel. The monitoring device 12 has camera shooting and scanning functions and is communicatively connected with the server 10. After the farmer brings a goods box to the farmland, the monitoring device 12 scans and verifies the goods box and generates a control instruction for controlling the goods box to be opened after the verification is passed.

The transit device 14 is configured to accommodate a target agricultural product.

The transit device 14 is the goods box described above. It should be noted that the goods box has functions such as storage, disinfection, and preservation. If a relatively large quantity of agricultural products are to be purchased by the consumer, a truck loaded with agricultural products may also be used as the transit device 14 in order to save the cost of express delivery, wherein the truck is loaded with a large number of goods boxes.

In this embodiment, the loading port or the pickup port of the transit device 14 may be provided with an electronic lock. In one example, the transit device may perform information interaction with the server 10, the monitoring device 12, or the consumer terminal to open the loading port or the pickup port under the control of the server 10, the monitoring device 12, or the consumer terminal. In another example, the electronic lock of the transit device may be provided with an input component. After the farmer or consumer obtains a verification code corresponding to the transit device via the monitoring device 12 or the mobile terminal, the farmer or consumer may enter the verification code via an input component to open the loading port or the pickup port of the transit device 14, wherein the verification code of the same transit device 14 may vary under the control of the server 10.

In the process the agricultural product transaction, the following technical effects can be achieved by using the system for supplying agricultural products:

At the front end of the supply chain (vegetable fields/orchards or the like), the authentic correspondence between vegetables or fruit to be purchased and designated farmlands can be achieved. In addition, the entire process can be visualized. Moreover, a short video of the picking process may be generated and provided to the consumer, so that the consumers can confirm that the agricultural products purchased by them indeed come from the target places of origin designated by them.

In the intermediate transportation stage, the goods can be prevented from being stolen or swapped, because the goods box can be opened only at the front end or the consumer terminal.

At the consumer's terminal, some requirements of the consumers can be met, for example, the picking time may be provided to the consumers and selectable by the consumers based on a solution allowing monitoring of the entire process.

The trust between consumers and farmers can be effectively established by the system described above, the farmer end may benefit more from the value chain can be transferred to, and some profits can be surrendered to the consumers to indirectly improve the quality of life of the consumers.

According to an optional example of this embodiment, the monitoring device 12 is configured to scan the transit device 14 to obtain first identity information about the transit device 14; and to determine the identity verification result based on the first identity information.

In some optional examples of this embodiment, the monitoring device 12 is further configured to match the first identity information with second identity information acquired in advance; and to determine that the transit device 14 passes the verification when if matching result indicates that the first identity information is consistent with the second identity information.

Optionally, the monitoring device 12 is further configured to acquire the second identity information by: receiving, from the server 10, the second identity information determined in accordance with the selection instruction. In other words, after the consumer successfully places and pays for an order, the server 10 may send data such as order information and a correspondence relation between the goods box and the order to the monitoring device 12.

Optionally, the server is further configured to send the second identity information to a monitoring device corresponding to the place of origin of the target agricultural product according to the selection instruction sent from the consumer terminal. In this way, only the monitoring device 12 corresponding to the place of origin of the target agricultural product will obtain the second identity information, and generate a control instruction for opening the loading port of the transit device when the identity verification result indicates that the verification is passed. Thus, it is ensured that the transit device 14 can be opened and loaded with goods only at the place of origin of the target agricultural product.

In some optional examples of this embodiment, after the farmer brings a goods box to the farmland, the monitoring device 12 scans a two-dimensional code or barcode on the goods box to acquire the identity information about the goods box, and then compares the identity information with the previously received order information and correspondence relation between the goods box and the order which are sent from the server 10. If the identity information about the goods box is consistent with the previously received order information and correspondence relation between the goods box and the order, it is determined that the identity verification of the goods box is passed, and then a control instruction for controlling the opening of the goods box is generated.

An authentic correspondence between an agricultural product to be purchased and the designated place of origin of the agricultural product can be achieved by the above functions.

Optionally, in another example of this embodiment, the monitoring device 12 is further configured to send the first identity information to the server 10. The server 10 is further configured to compare the first identity information with the second identity information determined in accordance with the selection instruction, determine the identity verification result in accordance with the comparison result, and send the identity verification result to the monitoring device 12, wherein the identity verification result is determined as passing the verification when the comparison result indicates that the first identity information is consistent with the second identity information.

For example, after the farmer brings a goods box to the farmland, the monitoring device 12 scans a two-dimensional code or barcode on the goods box to acquire the identity information about the goods box and then the monitoring device may send the identity information about the goods box acquired by scanning to the server 10. The server 10 receives the identity information about the goods box, and then compares it with the identity information about the goods box stored locally on the server. If the two pieces of identity information are consistent with each other, the server determines that the identity verification of the goods box is passed, and sends, to the monitoring device, a notification indicating that the verification of the identity information about the goods box is passed.

Optionally, the server 10 is configured to acquire the location of the monitoring device 12 that sends the first identity information, and compare and verify the location of the monitoring device 12 with the place of origin of the target agricultural product obtained from the selection instruction, and compare, after the verification is passed, the first identity information with the second identity information determined in accordance with the selection instruction and determine the identity verification result in accordance with the comparison result. In this way, whether the transit device 14 is scanned by the monitoring device 12 corresponding to the place of origin of the target agricultural product can be confirmed by the server 10, thereby ensuring that the transit device 14 can be opened and loaded with goods only at the place of origin of the target agricultural product.

Optionally, the monitoring device 12 is further configured to capture and record multimedia information about a picking process in which agricultural products are picked at the place of origin, and send the multimedia information to the consumer terminal. In this way, the consumer can confirm that the agricultural product purchased by him/her is indeed picked at the place of origin selected by him/her with the help of the multimedia information.

According to an optional example of this embodiment, the consumer terminal is further configured to scan a graphical identifier displayed on a target object and display the multimedia information in an interface determined based on the scan result, wherein the target object includes: the transit device or the target agricultural product; or the multimedia information is displayed in an order interface of the consumer terminal, wherein the order interface is configured to display an order request of the target agricultural product.

According to an optional example of this embodiment, after the scanning and verification have been performed by the monitoring device 12, the goods box is opened, and then the farmer puts the picked agricultural products into the goods box while being "monitored" by the monitoring device 12 until the picking is completed and the goods box is closed. The entire process will be shot by the monitoring device 12 and pushed to the consumer of the order corresponding to the goods box via the server 10, or may not be pushed and may be acquired by a consumer in need thereof via an APP or an official account of social software on the terminal. The consumer may use a mobile terminal to scan a two-dimensional code on the goods box or on the agricultural product, and then an interface provided with an option of whether to watch the picking video is popped up on the software of the mobile terminal; or the consumer may watch the picking video via a link or video box for watching the picking video displayed on the order interface.

With this function, an operation allowing visualizing the entire process of picking agricultural products can be achieved.

According to an optional example of this embodiment, the selection instruction further includes: farmer information corresponding to the target agricultural product which allows selection of farmers.

Optionally, an identifier of a mobile terminal (i.e. a terminal identifier) which is corresponding to different customer information is pre-stored in server 10, wherein the terminal identifier can be identification information that can represent the unique identity of the mobile terminal, such as the International Mobile Equipment Identity (IMEI). The server 10 is further configured to determine a terminal identifier corresponding to the farmer information based on the farmer information; and send a notification message to a mobile terminal corresponding to the terminal identifier, wherein the notification message is used for notifying the farmer to collect the target agricultural product.

In some optional examples of this embodiment, when a consumer places an order, the generated order information further includes the farmer information corresponding to the agricultural product to be purchased. If a consumer does not want to pick the purchased agricultural product immediately after the consumer places and pays an order, the consumer may send, via the mobile terminal, an instruction indicating that the agricultural product shall not be picked immediately and shall be picked a few days later. After receiving the instruction, the server 10 searches for contact information on the farmer, such as a mobile phone number of the farmer, based on the farmer information, and then forwards the received instruction to the farmer via the mobile phone number of the farmer to remind the farmer of the scheduled time for picking the agricultural product in the order.

This function can provide consumers with picking time, which allows the consumers to select the appropriate picking time, and provide the consumers with more consumer-friendly services.

Optionally, the server 10 is further configured to receive location information sent from the mobile terminal; match the location information with the place of origin; and send a command of acquiring the identity verification result to the monitoring device 12 if the location information and the place of origin are determined to be consistent through matching.

According to an optional example of this embodiment, when the farmer verifies the goods box using the monitoring device 12, the server 10 may also acquire location information on the farmer in real time, and then match the location information with information on the place of origin of the agricultural product. When location information on the farmer and the information on the place of origin are determined to be consistent through matching, the verification is passed, and the monitoring device 12 is notified to generate an instruction for opening the goods box.

With the above function, the authentic correspondence between the agricultural product to be purchased and the designated place of origin of the agricultural product can be further ensured.

In some optional examples of this embodiment, the monitoring device 12 is further configured to issue a warning prompt in a case where it is detected that the loading port of the transit device is in an opened state and the transit device is moved outside the monitoring range of the monitoring device; or to control the transit device to close the loading port when it is detected that the transit device is moved outside the monitoring range of the monitoring device from the monitoring scope of the monitoring device, and to acquire an of identity verification result of the transit device again to verify the transit device when it is detected that the transit device is moved into the monitoring range again. That is to say, if the transit device is moved out of the video monitoring range of the monitoring device 12 before it is closed, the monitoring device 12 will issue a warning or control the transit device 14 to be directly closed, so that the loading port of the transit device 14 can be opened only after it is scanned and verified successfully again.

It should be noted that, in this embodiment, the loading port and the pickup port of the transit device may be represented as the same opening. Specifically, the two may be represented as an opening appearing when the same closure cover is opened.

Figure 2:
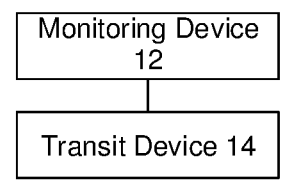
FIG. 2 is a structural diagram of another system for supplying agricultural products according to an embodiment of the present disclosure.

FIG. 2 is a structural diagram of another system for supplying agricultural products according to this embodiment. As shown in FIG. 2, the system includes: a monitoring device 12 and a transit device 14 configured to accommodate a target agricultural product, wherein the monitoring device 12 has a correspondence relation with a place of origin of the target agricultural product, and is configured to acquire an identity verification result of the transit device, and generate a control instruction for opening a loading port of the transit device when the identity verification result indicates that the verification is passed.

In some examples of this embodiment, in order to ensure the authenticity of the operation process, the monitoring device 12 is further configured to issue a warning prompt in a case where it is detected that the loading port of the transit device is in an opened state and the transit device is moved outside the monitoring range of the monitoring device; or to control the transit device to close the loading port when it is detected that the transit device is moved outside the monitoring range of the monitoring device from the monitoring range of the monitoring device, and to acquire an identity verification result of the transit device again to verify the transit device when it is detected that the transit device is moved into the monitoring range again.

It should be noted that an optional implementation of the embodiment shown in FIG. 2 may be understood with reference to the related description of the embodiment shown in FIG. 1, and will not be described in detail herein.

Figure 3:
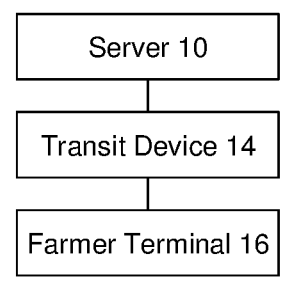
FIG. 3 is a structural diagram of another system for supplying agricultural products according to an embodiment of the present disclosure.

FIG. 3 is a structural diagram of another system for supplying agricultural products according to this embodiment. As shown in FIG. 3, the system includes: a server 10, a farmer terminal 16, and a transit device 14, wherein the server 10 is configured to receive a selection instruction from a consumer terminal; determine a transit device 14 in accordance with the selection instruction; and assign a first verification code corresponding to the transit device 14 to the consumer terminal, wherein the first verification code is used for providing a verification basis for a consumer to open a pickup port of the transit device 14, and the selection instruction is at least used for selecting a place of origin of a target agricultural product.

According to an optional example of this embodiment, in the process of the agricultural product transaction, a goods box may be used as the transit device when a consumer purchases agricultural products such as vegetables/fruit from a certain farmer or a certain land (which may be selected from an area such as a country, a province, an urban area, or the like, to an individual farmland). The consumer places an order via software or an official account of social software (e.g. Wechat) on a mobile terminal after selecting an agricultural product(s) to be purchased. After the consumer places the order, the server 10 automatically assigns a goods box to the order. Here, the goods box is provided thereon with a two-dimensional code or barcode, and the two-dimensional code or barcode has a unique correspondence relation with the order. It should be noted that the correspondence relation between the order and the two-dimensional code or barcode is time-effective. For example, if the consumer fails to make a payment within two hours after the order is placed, the above-mentioned correspondence relation becomes invalid. In other words, if the consumer fails to make a payment within a certain preset time after the order is placed, the server 10 may assign the goods box to a new order.

After the consumer successfully makes the payment, the server 10 sends a verification code to the consumer. The verification code has a correspondence relation with the goods box. After the consumer receives the goods box, the goods box can be opened only in accordance with the verification code. For example, after the consumer receives the goods box, the goods box can be opened only when the consumer scans a two-dimensional code or barcode on the goods box and then enters the verification code. The pickup port on the goods box may also serve as a loading port. This function can prevent the goods from being swapped (stealthily substituted) or artificially damaged during transportation.

The farmer terminal 16 is configured to send location information to the server 10; and receive a second verification code sent from the server 10, and control the transit device 14 to open the loading port in accordance with the second verification code; the server 10 is further configured to match the location information with the place of origin and send the second verification code to the farmer terminal 16 when the location information and the place of origin are determined to be consistent through matching.

According to an optional example of this embodiment, when a farmer verifies a goods box using the monitoring device 12, the farmer may also need to send his/her real-time location information to the server 10 via the farmer terminal 16, and the server 10 receives the location information sent from the farmer terminal 16, and then match the location information with information on the place of origin of the agricultural product. When the location information and information on the place of origin of the agricultural product are determined to be consistent through matching, the verification is passed, a verification code is sent to the farmer terminal 16, and the farmer opens the goods box using the verification code.

The transit device 14 is configured to accommodate the target agricultural product.

The transit device 14 is the goods box described above. It should be noted that the goods box has functions such as storage, disinfection, and preservation. If relatively large quantities of agricultural products are purchased by the consumer, a truck loaded with agricultural products may also be used as the transit device 14 in order to save the cost of express delivery, wherein the truck is loaded with a large number of goods boxes.

In some optional examples of this embodiment, the transit device 14 may further be provided with an electronic lock with a positioning function. The electronic lock has a communication function. When the farmer opens the goods box, the electronic lock is triggered to send the positioned location information to the server 10 to further verify the information on the location where the agricultural product is picked.

It should be noted that an optional implementation of the embodiment shown in FIG. 3 may be understood with reference to the related description of the embodiment shown in FIG. 1, and will not be described in detail herein.

Figure 4:
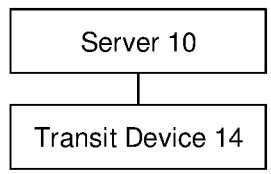
FIG. 4 is a structural diagram of another system for supplying agricultural products according to an embodiment of the present disclosure.

FIG. 4 is a structural diagram of another system for supplying agricultural products according to this embodiment. As shown in FIG. 4, the system includes a server 10 and a transit device 14 configured to accommodate a target agricultural product, Wherein the server 10 is configured to receive a selection instruction from a consumer terminal; determine the transit device 14 in accordance with the selection instruction; and assign a first verification code corresponding to the transit device 14 to the consumer terminal, wherein the first verification code is used for providing a verification basis for a consumer to open a pickup port of the transit device 14, and the selection instruction is at least used for selecting a place of origin of a target agricultural product.

According to an optional example of this embodiment, in the process of an agricultural product transaction, a goods box may be used as the transit device when a consumer purchases agricultural products such as vegetables/fruit from a certain farmer or a certain land (which may be selected from an area such as a country, a province, an urban area, or the like, to an individual farmland). The consumer places an order via software or an official account of social software (e.g. Wechat) on a mobile terminal after selecting an agricultural product(s) to be purchased. After the consumer places the order, the server 10 automatically assigns a goods box to the order. Here, the goods box is provided thereon with a two-dimensional code or barcode, and the two-dimensional code or barcode has a unique correspondence relation with the order. It should be noted that the correspondence relation between the order and the two-dimensional code or barcode is time-effective. For example, if the consumer fails to make a payment within two hours after the order is placed, the above-mentioned correspondence relation becomes invalid. In other words, if the consumer fails to make a payment within a certain preset time after the order is placed, the server 10 may assign the goods box to a new order.

After the consumer successfully makes the payment, the server 10 sends a verification code to the consumer. The verification code has a correspondence relation with the goods box. After the consumer receives the goods box, the goods box can be opened only in accordance with the verification code. For example, after the consumer receives the goods box, the goods box can be opened only when the consumer scans a two-dimensional code or barcode on the goods box and then enters the verification code. The pickup port on the goods box may also serve as the loading port. This function can prevent the goods from being swapped (stealthily substituted) or artificially damaged during transportation.

The transit device 14 is configured to send location information of the transit device to the server 10; receive a second verification code sent from the server, and control a loading port of the transit device 14 to be opened in accordance with the second verification code; the server is further configured to match the location information with the place of origin and send the second verification code to the transit device 14 when the location information and the place of origin are determined to be consistent through matching.

The transit device 14 is the goods box described above. It should be noted that the goods box has functions such as storage, disinfection, and preservation. If relatively large quantities of agricultural products are to be purchased by the consumer, a truck loaded with agricultural products may also be used as the transit device 14 in order to save the cost of express delivery, wherein the truck is loaded with a large number of goods boxes.

In some optional examples of this embodiment, the transit device 14 further has a positioning function and a communication function. After the farmer arrives at an area where the agricultural product is to be picked, the transit device 14 is triggered to send the positioned real-time location information to the server 10. The server 10 receives the location information sent from the transit device 14 and compares the location information with information on the place of origin of the agricultural product. If the two pieces of information are consistent with each other, the verification is passed, and the server 10 sends a control instruction to automatically open the transit device 14.

Figure 5:
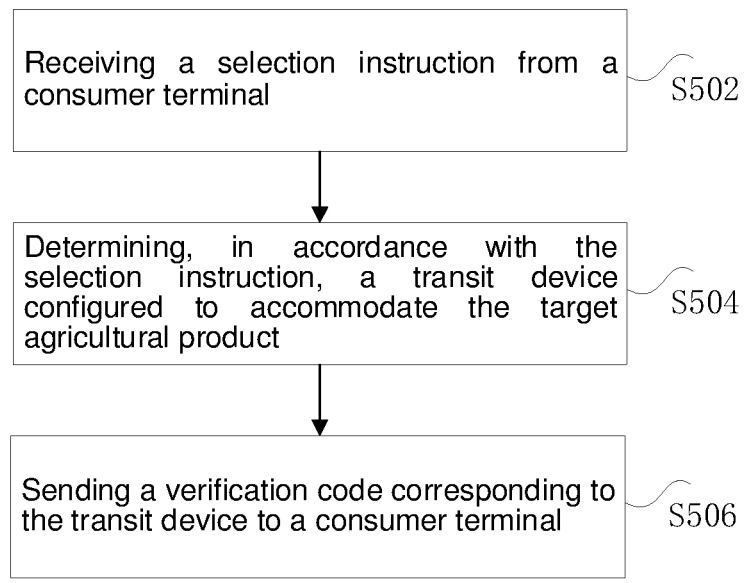
FIG. 5 is a flowchart of a method for supplying agricultural products according to an embodiment of the present disclosure.

FIG. 5 is a flowchart of a method for supplying agricultural products according to this embodiment. As shown in FIG. 5, the method includes the following steps:

step S502 of receiving a selection instruction from a consumer terminal, wherein the selection instruction is at least used for selecting a place of origin of a target agricultural product;

step S504 of determining, in accordance with the selection instruction, a transit device configured to accommodate the target agricultural product; and step S506 of sending a verification code corresponding to the transit device to a consumer terminal, where the verification code is used for providing a verification basis for a consumer to open a pickup port of the transit device.

The steps S502 to S506 provide a method for supplying agricultural products. A consumer places an order via software or an official account of social software (such as WeChat) on a mobile terminal to select an agricultural product(s) to be purchased, wherein the order information includes information on the place of origin of the purchased agricultural product. After the consumer places the order, a goods box is automatically assigned to the order, wherein the goods box is provided thereon with a two-dimensional code or barcode, and the two-dimensional code or barcode has a unique correspondence relation with the order. It should be noted that the correspondence relation between the order and the two-dimensional code or barcode is time-effective. For example, if the consumer fails to make a payment within two hours after the order is placed, the above-mentioned correspondence relation becomes invalid. In other words, if the consumer fails to make a payment within a certain preset time after the order is placed, the goods box may be assigned to a new order.

After the consumer successfully makes the payment, a verification code is sent to the consumer. The verification code has a correspondence relation with the goods box. After the consumer receives the goods box, the goods box can be opened only in accordance with the verification code. For example, after the consumer receives the goods box, the goods box can be opened only when the consumer scans a two-dimensional code or barcode on the goods box and then enters the verification code. The pickup port on the goods box may also serve as the loading port. This function can prevent the goods from being swapped (stealthily substituted) or artificially damaged during transportation.

In some optional examples of this embodiment, the above method further includes: receiving first identity information sent from a monitoring device having a correspondence relation with the place of origin of the target agricultural product, wherein the first identity information is acquired by the monitoring device by scanning the transit device; comparing the first identity information with second identity information determined in accordance with the selection instruction; determining a result of identity verification result of the transit device in accordance with the comparison result; and sending the identity verification result to the monitoring device, wherein the identity verification result is used for generating a control instruction for opening a loading port of the transit device.

After a farmer brings a goods box to the farmland, the monitoring device scans a two-dimensional code or barcode on the goods box to acquire the identity information about the goods box and then sends the identity information about the goods box acquired by scanning to the server. The server receives the identity information about the goods box, and then compares it with the identity information about the goods box stored locally on the server. If the two pieces of identity information are consistent with each other, the server determines that the identity verification of the goods box is passed, and sends, to the monitoring device, a notification indicating that the verification of the identity information about the goods box is passed, and the monitoring device generates a control instruction to open the goods box. It should be noted that the monitoring device is disposed in a farmland or near the farmland and may be powered by a solar panel. The monitoring device has camera shooting and scanning functions and is communicatively connected with the server.

Figure 6:
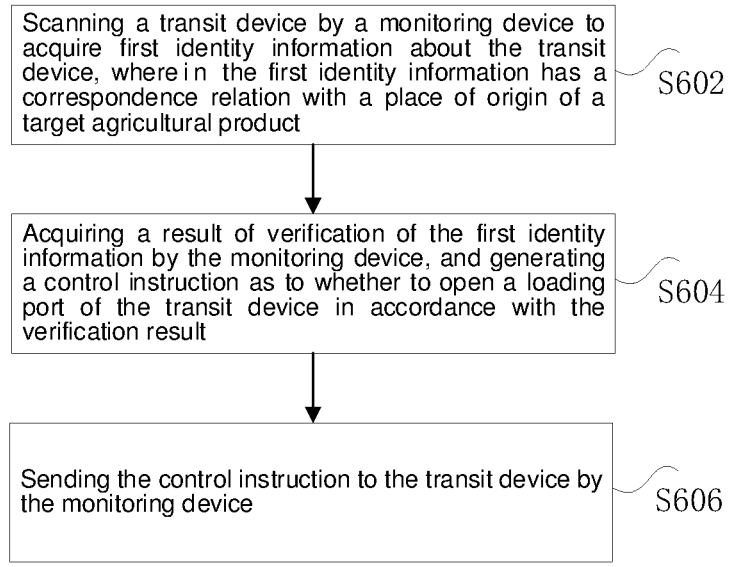
FIG. 6 is a flowchart of another method for supplying agricultural products according to an embodiment of the present disclosure.

FIG. 6 is a flowchart of a method for supplying agricultural products according to this embodiment. As shown in FIG. 6, the method includes the following steps:

step S602 of a monitoring device scanning a transit device to acquire first identity information about the transit device;

step S604 of the monitoring device acquiring a verification result of the first identity information, and generating a control instruction as to whether to open a loading port of the transit device in accordance with the verification result; and step S606 of the monitoring device sending the control instruction to the transit device.

The steps S602 to S606 provide another method for supplying agricultural products. The monitoring device scans a two-dimensional code or barcode on a goods box to acquire identity information about the goods box, and then verifies the acquired identity information. If the verification of the identity information about the goods box is passed, the monitoring device generates a control instruction for opening the goods box, and sends the control instruction to the goods box to open the goods box. It should be noted that the monitoring device is disposed in a farmland or on a side of the farmland and may be powered by a solar panel. The monitoring device has camera shooting and scanning functions and is communicatively connected with the server.

In some optional examples of this embodiment, the execution of the step S604 includes: the monitoring device comparing the first identity information with second identity information acquired in advance, and determining the verification result in accordance with the comparison result; or the monitoring device sending the identity information to the server, and the monitoring device receiving the verification result of the first identity information from the server.

According to an optional example of this embodiment, the monitoring device may also send to the server the identity information about the goods box which is acquired by scanning. The server receives the identity information about the goods box, and then compares it with the identity information about the goods box stored locally on the server. If the two pieces of identity information are consistent with each other, the server determines that the identity verification of the goods box is passed, and sends, to the monitoring device, a notification indicating that the verification of the identity information about the goods box is passed, and the monitoring device generates a control instruction for opening the goods box.

According to an optional example of this embodiment, in the step S604, the monitoring device may acquire location information of the monitoring device and send the location information to the server. The server matches the location information with the place of origin, and verifies the first identity information and sends the verification result to the monitoring device when the location information and the place of origin are determined to be consistent through matching.

According to an optional example of this embodiment, the monitoring device may also send its own location information to the server. The server receives the location information of the monitoring device and then compares the location information with information on the place of origin of the agricultural product, and sends the comparison result to the monitoring device.

Figure 7:
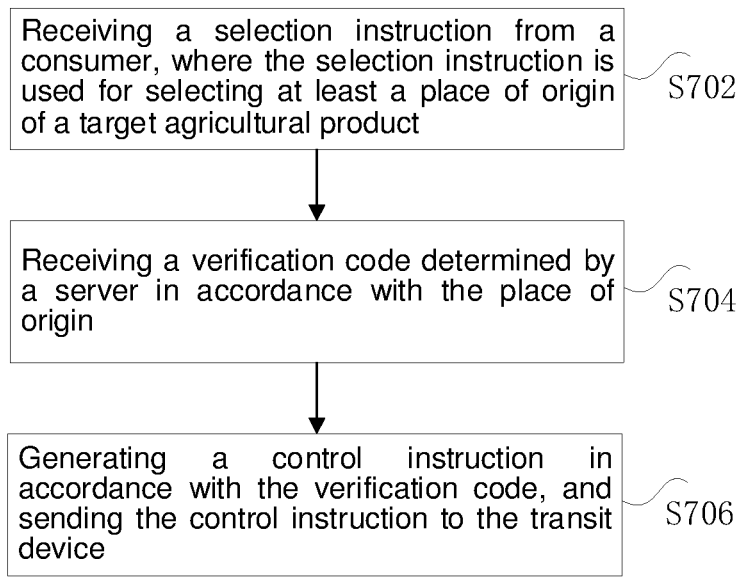
FIG. 7 is a flowchart of a transaction processing method for agricultural products according to an embodiment of the present disclosure.

FIG. 7 is a flowchart of a transaction processing method for agricultural products according to this embodiment. As shown in FIG. 7, the method includes the following steps:

step S702 of receiving a selection instruction from a consumer, wherein the selection instruction is at least used for selecting a place of origin of a target agricultural product;

step S704 of receiving a verification code determined by a server in accordance with the place of origin, wherein the verification code provides a verification basis for opening of a pickup port of the transit device, wherein the transit device is configured to accommodate the target agricultural product; and step S706 of generating a control instruction in accordance with the verification code, and sending the control instruction to the transit device, wherein the control instruction is for opening an unloading port of the transit device.

The steps S702 to S706 provide a transaction processing method for agricultural products. A consumer places an order via software or an official account of social software (such as WeChat) on a mobile terminal after selecting an agricultural product(s) to be purchased. After the consumer places the order, a goods box is automatically assigned to the order. Here, the goods box is provided thereon with a two-dimensional code or barcode, and the two-dimensional code or barcode has a unique correspondence relation with the order.

After the consumer successfully makes a payment, the server sends a verification code to the consumer. The verification code has a correspondence relation with the goods box. After the consumer receives the goods box, the goods box can be opened only in accordance with the verification code. For example, after the consumer receives the goods box, the goods box can be opened only when the consumer scans the two-dimensional code or barcode on the goods box and then enters the verification code. The pickup port on the goods box may also serve as the loading port. This function can prevent the goods from being swapped (stealthily substituted) or artificially damaged during transportation.

According to an optional example of this embodiment, the above method further includes: receiving multimedia information generated at the place of origin of the target agricultural product, wherein the multimedia information is used for reflecting a process of operation on the target agricultural product at the place of origin of the target agricultural product; and displaying the multimedia information.

In some optional examples of this embodiment, the receiving the multimedia information generated at the place of origin of the target agricultural product includes: scanning a graphical identifier displayed on a target object and displaying the multimedia information in an interface determined based on the scan result, wherein the target object includes: the transit device or the target agricultural product; or displaying the multimedia information in an order interface of a consumer terminal, wherein the order interface is configured to display an order request of the target agricultural product.

Optionally, the selection instruction further includes: farmer information corresponding to the target agricultural product.

According to an optional example of this embodiment, after the goods box is opened, the farmer puts the picked agricultural products into the goods box while being "monitored" by the monitoring device 12 until the picking is completed and the goods box is closed. The entire process will be shot by the monitoring device and pushed to the consumer of the order corresponding to the goods box via the server, or may not be pushed and may be acquired by a consumer in need thereof via an APP or an official account of social software on the terminal. The consumer may use a mobile terminal to scan a two-dimensional code on the goods box or on the agricultural product, and then an interface provided with an option of whether to watch the picking video is popped up on the software of the mobile terminal; or the consumer may watch the picking video via a link or video box for watching the picking video displayed on the order interface.

With this function, an operation allowing visualizing the entire process of picking agricultural products can be achieved.

Figure 8:
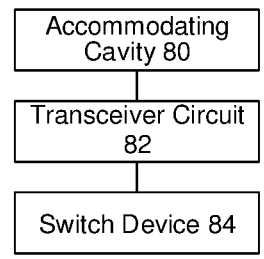
FIG. 8 is a structural diagram of a transit device according to an embodiment of the present disclosure.

FIG. 8 is a structural diagram of a transit device according to this embodiment. As shown in FIG. 8, the transit device includes:

an accommodating cavity 80 configured to accommodate a target agricultural product, wherein the accommodating cavity 70 is provided with a pickup port and a loading port;

a transceiver circuit 82 configured to receive a first unlocking instruction from a consumer terminal and a second unlocking instruction from a monitoring device, wherein the monitoring device has a correspondence relation with a place of origin of the target agricultural product; and a switch device 84 configured to open the pickup port in accordance with the first unlocking instruction and open the loading port in accordance with the second unlocking instruction.

In the embodiments, the description of each embodiment has its own emphasis. A part that is not described in detail in one embodiment may be understood with reference to related descriptions of other embodiments.

In the embodiments, it should be understood that the disclosed technical disclosure may be implemented in other ways. Here, the embodiments of the apparatus described above are merely illustrative in nature. For example, the division of the units is only a division by logical functions, and additional division modes may be adopted in practical implementation. For example, multiple units or components may be combined or integrated into another system, or some features may be omitted or not executed. In addition, the mutual coupling, or direct coupling or communication connection illustrated or discussed may be implemented via indirect coupling or communication between some interfaces, units, or modules, which may be electronic, mechanical or in other forms.

The units described as separate components may be or not be separated physically, and the components illustrated as units may be or not be physical units, namely, they may be located at one place or they may be distributed onto multiple network units. Some or all of the units may be selected as actually required to fulfill the purposes of the solutions of the embodiments.

Besides, the individual functional units in the embodiments may be integrated into one processing unit, or each of the units may be physically stand-alone, or two or more of the units may be integrated into one unit. The above integrated unit may be implemented either in the form of hardware or in the form of a software functional unit.

When implemented in the form of a software functional module and sold or used as an independent product, the integrated unit may be stored in a computer-readable storage medium. Based on such understanding, a technical solution of the present disclosure essentially, or the part thereof contributing to the prior art, or the entirety or a part of the technical solution may be embodied in the form of a software product. The computer software product is stored in a storage medium, and includes a number of instructions for causing a computer device (which may be a personal computer, a server, a network device, or the like) to execute all or some of the steps of the methods described in the various embodiments of the present disclosure. The preceding storage medium includes any medium that can store program codes, such as a USB flash disk, a read-only memory (ROM), a random access memory (RAM), a mobile hard disk, a magnetic disk, or an optical disk.

The above description is merely illustrative of optional embodiments of the present disclosure. It should be noted that several improvements and modifications can be made by those of ordinary skill in the art without departing from the principles of the present disclosure. These improvements and modifications should also be considered to be within the scope of protection of the present disclosure.

INDUSTRIAL APPLICABILITY

The embodiments provide a system and method for supplying agricultural products and a transaction processing method for agricultural products. The interaction and cooperation between a server, monitoring devices, and transit devices enable consumers to know that agricultural products as purchased by them are from places of origin selected by them, and it is ensured that the purchased agricultural products cannot be swapped during transportation. In this way, direct contact between consumers and farmers is established, the trust between consumers and farmers can be enhanced, the value chain can be transferred to the farmer end, and some profits can be surrendered to the consumers to indirectly improve the quality of life of the consumers, thereby solving the technical problem that farmers acquire low profits and the price paid by consumers often does not equal the value of the purchased agricultural products due to absence of direct contact between the consumers and the farmers in the prior agricultural product transaction model.

What is claimed is:

1. A system for supplying agricultural products, comprising: a server, a monitoring device, and a transit device,
   wherein the server is configured to receive a selection instruction from a consumer terminal, determine a transit device in accordance with the selection instruction, and assign a verification code corresponding to the transit device to the consumer terminal, wherein the verification code is used for providing a verification basis for a consumer to open a pickup port of the transit device, and the selection instruction is at least used for selecting a place of origin of a target agricultural product;
   the monitoring device has a correspondence relation with the place of origin of the target agricultural product, and is configured to acquire an identity verification result of the transit device and generate a control instruction for opening a loading port of the transit device when the identity verification result indicates that the verification is passed; and
   the transit device is configured to accommodate the target agricultural product.

2. The system according to claim 1, wherein the monitoring device is configured to scan the transit device to obtain first identity information about the transit device; and to determine the identity verification result based on the first identity information.

3. The system according to claim 2, wherein the monitoring device is further configured to match the first identity information with second identity information acquired in advance; and to determine that the transit device passes the verification if the matching result indicates that the first identity information is consistent with the second identity information.

4. The system according to claim 3, wherein the monitoring device is further configured to acquire the second identity information by: receiving from the server the second identity information determined in accordance with the selection instruction.

5. The system according to claim 4, wherein the server is further configured to send the second identity information to a monitoring device corresponding to the place of origin of the target agricultural product according to the selection instruction sent from the consumer terminal.

6. The system according to claim 3,
   wherein the monitoring device is further configured to send the first identity information to the server; and
   the server is further configured to compare the first identity information with the second identity information determined in accordance with the selection instruction, determine the identity verification result in accordance with the comparison result, and send the identity verification result to the monitoring device, wherein the identity verification result is determined as passing the verification if the comparison result indicates that the first identity information is consistent with the second identity information.

7. The system according to claim 6, wherein the server is configured to acquire the location of the monitoring device that sends the first identity information, and compare and verify the location of the monitoring device with the place of origin of the target agricultural product obtained from the selection instruction, and compare, after the verification is passed, the first identity information with the second identity information determined in accordance with the selection instruction and determine the identity verification result in accordance with the comparison result.

8. The system according to claim 1, wherein the monitoring device is further configured to capture and record multimedia information about a picking process in which the agricultural products are picked at the place of origin, and send the multimedia information to the consumer terminal or the server.

9. The system according to claim 8, further comprising the consumer terminal, wherein the consumer terminal is further configured to scan a graphical identifier displayed on a target object and display the multimedia information in an interface determined based on the scan result, wherein the target object includes: the transit device or the target agricultural product; or the multimedia information is displayed in an order interface of the consumer terminal, wherein the order interface is an interface configured to display an order request of the target agricultural product.

10. The system according to claim 1, wherein the selection instruction further includes: farmer information corresponding to the target agricultural product.

11. The system according to claim 10, wherein the server is further configured to determine a terminal identifier corresponding to the farmer information based on the farmer information; and send a notification message to a mobile terminal corresponding to the terminal identifier, wherein the notification message is used for notifying the farmer to collect the target agricultural product.

12. The system according to claim 11, wherein the server is further configured to receive location information sent from the mobile terminal; match the location information with the place of origin; and send a command of acquiring the identity verification result to the monitoring device when the location information and the place of origin are determined to be consistent with each other through the matching.

13. The system according to claim 1, wherein the monitoring device is further configured to:
   issue a warning prompt in a case where it is detected that the loading port of the transit device is in an opened state and the transit device is moved to outside a monitoring range of the monitoring device; or
   control the transit device to close the loading port when it is detected that the transit device is moved from inside to outside the monitoring range of the monitoring device, and to acquire an identity verification result of the transit device again to verify the transit device when it is detected that the transit device is moved into the monitoring range again.

14. A method for supplying agricultural products, comprising:
   a monitoring device scanning a transit device to acquire first identity information about the transit device;
   the monitoring device acquiring a result of verification of the first identity information, and generating, in accordance with the verification result, a control instruction as to whether to open a loading port of the transit device; and
   the monitoring device sending the control instruction to the transit device.

15. The method according to claim 14, wherein the monitoring device acquiring a result of verification of the first identity information includes one of the following:
   the monitoring device comparing the first identity information with second identity information acquired in advance; and determining the verification result in accordance with the comparison result; and the monitoring device sending the identity information to the server; and the monitoring device receiving, from the server, the verification result of the first identity information.

16. The method according to claim 14, wherein the monitoring device acquiring a result of verification of the first identity information includes:
   the monitoring device acquiring location information of the monitoring device and sending the location information to the server; and
   the server matching the location information with a place of origin designated by a consumer, and verifying the first identity information and sending the verification result to the monitoring device when the location information and the place of origin are determined to be consistent with each other through the matching.

17. A transaction processing method for agricultural products, comprising:
   receiving a selection instruction from a consumer, wherein the selection instruction is at least used for selecting a place of origin of a target agricultural product;
   receiving a verification code determined by a server in accordance with the place of origin, wherein the verification code provides a verification basis for opening of a pickup port of a transit device, wherein the transit device is configured to accommodate the target agricultural product;
   generating a control instruction in accordance with the verification code, and sending the control instruction to the transit device, wherein the control instruction is used for opening an unloading port of the transit device;
   receiving multimedia information generated at the place of origin of the target agricultural product, wherein the multimedia information is used for reflecting a process of operation on the target agricultural product at the place of origin of the target agricultural product; and
   displaying the multimedia information.

18. The method according to claim 17, wherein the receiving the multimedia information generated at the place of origin of the target agricultural product includes: scanning a graphical identifier displayed on a target object and displaying the multimedia information in an interface determined based on the scan result, wherein the target object includes: the transit device or the target agricultural product; or displaying the multimedia information in an order interface of the consumer terminal, wherein the order interface is configured to display an order request of the target agricultural product.

19. The method according to claim 17, wherein the selection instruction further includes: farmer information corresponding to the target agricultural product.

* * * * *